March 17, 1959  P. J. LINDER  2,878,054
MOTOR VEHICLE BODY

Filed July 19, 1956  2 Sheets-Sheet 1

INVENTOR
PETER J. LINDER
BY
ATTORNEY

March 17, 1959
P. J. LINDER
2,878,054
MOTOR VEHICLE BODY
Filed July 19, 1956
2 Sheets-Sheet 2
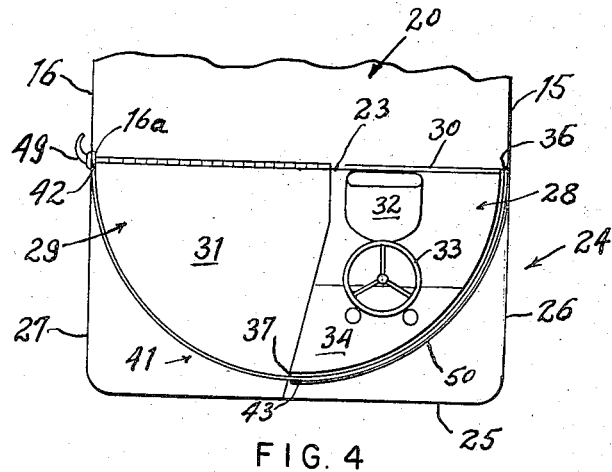
FIG. 4
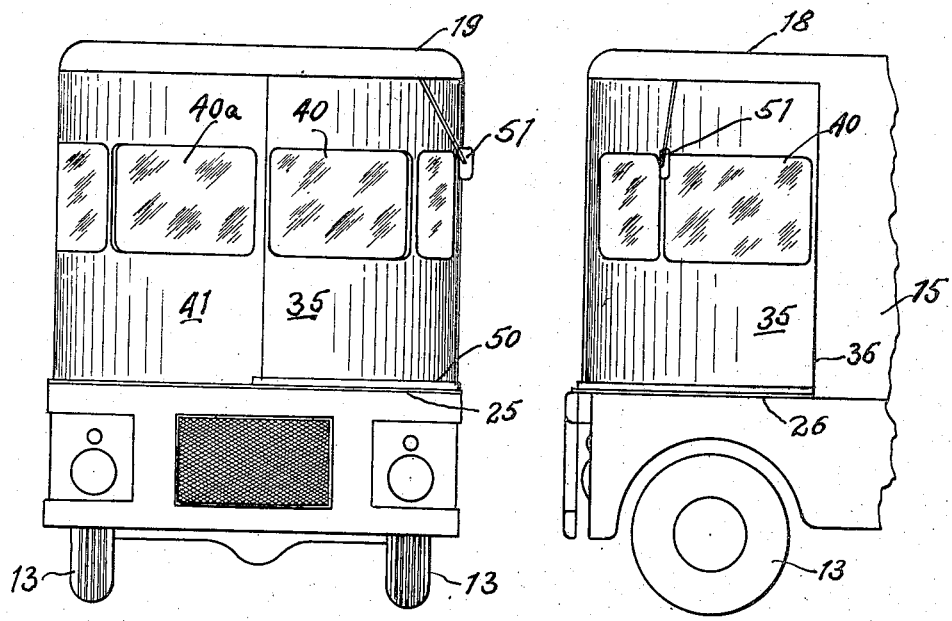
FIG. 2
FIG. 3
INVENTOR
PETER J. LINDER
BY
*Philip B. Hilbert*
ATTORNEY

United States Patent Office 2,878,054
Patented Mar. 17, 1959

2,878,054

MOTOR VEHICLE BODY

Peter J. Linder, Montclair, N. J.

Application July 19, 1956, Serial No. 598,917

8 Claims. (Cl. 296—24)

This invention relates to motor vehicle bodies; and more particularly, concerns commercial vehicles used for rapid pickup and delivery of dry freight.

Competitive conditions in the transportation field makes for ever increasing demands for greater efficiency and reduced costs in the operation of commercial motor vehicles. This is particularly true in the case of the multi-stop pickup and delivery type of vehicle which necessarily encounters diverse loading and delivery conditions. Thus, congested traffic conditions; different kinds of loading and delivery platforms; variations in the type of freight carried; and the time element involved in loading and unloading operations, all enter into the ultimate transportation costs calculated for this type of vehicle.

Accordingly, an object of this invention is to provide a commercial motor vehicle body having an improved frontal access construction which allows for direct connection between the freight carrying portion of the body and the driver's compartment, thereby eliminating the need for the driver to climb down out of his cab, walk around to the back of the truck and climb into the rear of the truck in order to load or unload the same, whereby to materially reduce loading and unloading time.

Another object of this invention is to provide an improved door construction for the front end of a delivery vehicle whereby freight may be loaded or unloaded directly from the front end of the vehicle, or alternatively, from one side of said vehicle at the front end thereof, thereby flexibilizing loading and unloading operations and coordinating the same to varied loading and unloading conditions.

A further object of this invention is to provide an improved door construction for the frontal portion of a commercial motor vehicle wherein closure means may be moved to selected positions all located inwardly of the side and front edges of the vehicle body, to regulate the size of the access opening to both the driver's compartment and to the freight carrying portion of the vehicle body.

Another object of this invention is to provide in a commercial delivery vehicle, a door construction which permits the vehicle to be loaded or unloaded directly from the front end thereof or from the right side adjacent the front end, as well as by way of the conventional rear door on such vehicle, thereby allowing access to the freight carrying portion of the vehicle at either end thereof to facilitate the unloading of particular items of freight in accordance with their specific location within the body.

Still another object of this invention is to provide in a commercial delivery vehicle, a door construction at the front end thereof which provides easy access to the driver's compartment from the front or right hand side of the vehicle, thereby avoiding traffic hazard, conventional left side access to the driver's compartment; and further, which allows access to the driver's compartment when either the front end or the right side of the vehicle is blocked due to loading or unloading conditions.

Yet another object of this invention is to provide in a commercial delivery vehicle, a door construction at the front end thereof having sliding movement in a path located inwardly of the front and side edge portions of the vehicle body whereby the door may be moved to open or closed positions when the edges of the vehicle body are in abutting relation to the edges of loading platforms.

Yet a further object of this invention is to provide in a delivery vehicle body, a door construction enclosing an access compartment at the front end thereof which communicates directly with the driver's compartment and the freight carrying portion of the body, minimizing the need for use of the rear door on the body and thus reducing the traffic hazards incident to the use of such rear door.

Still a further object of this invention is to provide an improved body construction for delivery vehicles which allows a substantial decrease in the overall length of the vehicle while retaining the maximum effective body length, thereby facilitating maneuvering and storing the vehicle, particularly in congested areas.

Still another object of this invention is to provide an improved door construction for a delivery vehicle arranged in a manner to obtain optimum use of the vehicle with but a single door and a single set of door hardware, representing a substantial economy in construction as compared to conventional multi-door vehicles.

Still a further object of this invention is to provide in a commercial, freight delivery vehicle, an improved single door body construction which permits loading and unloading of freight, as well as ingress and egress of the driver, all from the front or right hand side of the vehicle, thereby facilitating opening and locking the vehicle, and materially reducing traffic hazards in respect to both the driver and the contents of the vehicle.

Other objects of this invention will in part be obvious and in part hereinafter pointed out.

In the drawing,

Fig. 2 is a front elevational view thereof;

Fig. 3 is a side elevational view of the front end thereof;

Fig. 4 is a top plan view of the front end thereof;

Figure 1:
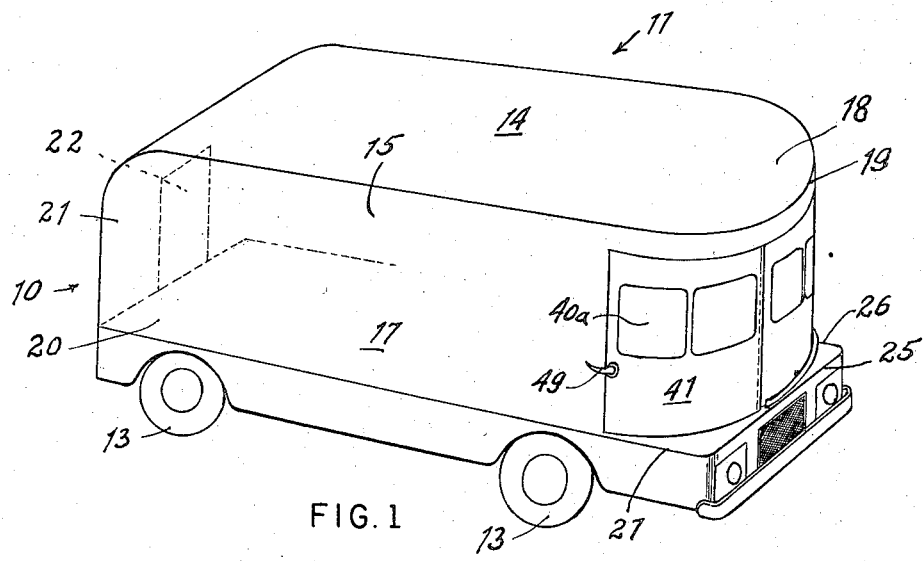
Fig. 1 is a perspective view of a commercial delivery vehicle embodying the invention, with parts thereof in dotted outline.
Figure 5:
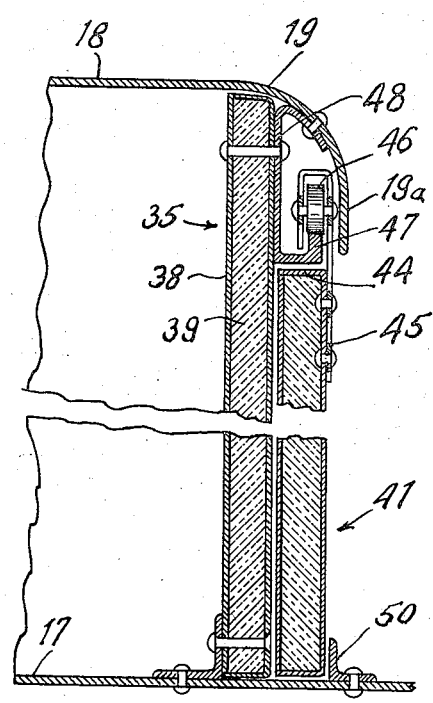
Fig. 5 is a vertical sectional view of the closure portion of the vehicle.

Referring in detail to the drawing and particularly to Fig. 1, 10 designates a commercial delivery vehicle embodying the invention. The same comprises an enclosed body 11 mounted on a chassis, not shown, which in turn is supported on the usual wheels 13. The body 11 comprises a roof structure 14, side walls 15, 16 depending therefrom and connected at their lower edges by a floor structure 17. The roof structure 14 extends beyond the forward edges of side walls 15, 16 to provide a semi-circular portion 18 having an arcuate edge 19.

The floor structure 17 may have a common level from end to end of body 11 and includes a freight carrying portion 20 extending from rear wall 21, which may include the usual rear access door 22, forwardly to a point indicated at transverse line 23; and a front end portion 24 defined by a transverse, rectilinear front edge 25 and rectilinear side edges 26, 27 which merge with body sides 15, 16 respectively.

Front end portion 24 of body 11 is divided to provide a driver's compartment 28 on the left hand half thereof, and an access compartment 29 on the right hand half thereof. A partition wall 30 may be located along line 23 to separate the driver's compartment 28 from the freight carrying portion 20 of the body to protect the driver from possibly shifting freight. The floor structure in access compartment 29 may comprise a metal deck member 31 hinged at its rear edge along line 23 to allow the same to be lifted to expose the power plant, not shown. Such power plant is a type known in the art and particularly adapted to be positioned beneath the body floor structure and in suitable relation to the chassis.

It will be apparent that access compartment 29 communicates at its rear directly with freight carrying portion 20 of the body and on its left side directly with driver's compartment 28 which contains the usual driver's seat 32, steering wheel 33, and dash panel 34. Accordingly, vehicle 10 may be driven up to loading platforms and loaded or unloaded directly from floor deck member 31 at either the right side edge 27 or front edge 25 thereof.

Closure means is provided for both the driver's compartment 28 and access compartment 29. To this end, a stationary panel 35 encloses compartment 28, such panel being laterally curved between the side edges 36, 37 thereof along an arc of about 90°. Panel 35 is suitably fixed at its top edge to the left hand half of roof edge 19 and at its bottom edge to floor structure 17 at the front end thereof. Side edge 36 of panel 35 abuts the side edge of side wall 15 and is suitably sealed thereto, thus locating side edge 37 of the panel at a mid section of front edge 25 of the floor structure 17 and slightly inwardly of edge 25.

Panel 35 may be suitably formed of composited sheets 38 of fiberglass reinforced plastic resin disposed on either side of a light, honeycomb type insulating core 39 formed of paper or other suitable material. Sheets 38 and core 39 are molded together on suitable forms to the required arcuate shape, framed openings being provided in the panel, to later receive inserts of suitably curved glass window 40 which are secured in place.

The access compartment is closed by a movable panel 41 laterally curved between side edges 42, 43 thereof along an arc of about 90° and being formed of materials similar to that of panel 35 and provided with windows 40a. Panel 41 is arranged for lateral movement in a curvilinear path which may have an arcuate extent of about 180°. To this end, panel 41 is suspended at its top edge 44 from edge 19 of roof portion 18 by means of roller bracket assemblies 45 suitably fixed at intervals to an outer marginal portion of panel 41 at edge 44 thereof, said assemblies including rollers 46 disposed in vertically spaced relation to panel edge 44. Rollers 46 engage a rail portion 47 of a semi-circular rail bracket assembly 48 fixed to edge 19 of roof portion 18. A downwardly extending skirt 19a at roof edge 19 encloses the roller and track assemblies.

In the closed position of panel 41, side edge 42 thereof abuts side edge 16a of side wall 16 and suitable locking means generally indicated at 49 will protect the interior of body 11 from unauthorized intruders. Side edge 43 of panel 41 will overlap side edge 37 of the stationary panel 35 and suitable stripping at said panel edges will render the joint therebetween weather tight.

It will be apparent that door panel 41 may be moved in an arcuate path located entirely interiorly of front edge 25 and side edges 26, 27 of the front end portion 24 of floor structure 17 to expose access compartment 29 with varying degrees of lateral opening up to a maximum of about 90°. In this manner, freight may be loaded or unloaded at front end portion 24 selectively at the right hand side edge 27 or the right hand half of front edge 25 thereof, and access to the driver's compartment 28 may be similarly had, without any need for using the hazardous left hand side of vehicle 10. Furthermore, use of the rear door 22 may be substantially eliminated except for emergencies, thereby avoiding the need for walking to the rear of the vehicle.

In addition, vehicle 10 may be driven up to loading platforms with the edges of the front end portion 24 thereof in contact with platform edges, yet allowing the movable door panel 41 to be freely moved to its fully open position, or to intermediate positions. Such arrangement of the movable door panel allows for greater flexibility in loading and unloading operations as well as in the manipulation of the vehicle itself in connection with such operations. The driver no longer is compelled to go to the back of the vehicle, unless absolutely necessary, in which case rear door 22 is used.

Means is provided for retaining the lower edge of movable door panel 41 in its arcuate path, in the form of a flanged member 50 of arcuate shape; the horizontal leg thereof being secured to front end portion 24 of the floor structure 17 and the vertical leg thereof being disposed adjacent the bottom edge of door panel 41. A rear view mirror 51 is secured to roof edge 19 at the proper position for view from the driver's compartment 28, the same clearing the path of movement of the movable door panel 41.

While the movable door panel 41 is shown as a one-piece member, it is understood that the same may comprise a plurality of panel portions suitably articulated in side by side relation to move smoothly in the indicated arcuate path. Furthermore, it is understood that the movable panel 41 could be arranged for arcuate movement interiorly of and adjacent to the fixed panel 35, rather than exteriorly thereof, as shown.

It will thus be seen that there has been provided a novel motor vehicle body in which the several objects of the invention have been achieved and which is well adapted to meet the conditions of practical use.

As various changes might be made in the embodiment of the invention herein shown and described, without departing from the spirit thereof, it is understood that all matter herein shall be deemed illustrative and not by way of limitation except as set forth in the appended claims.

Having thus disclosed my invention, I claim as new and desire to protect by Letters Patent:

1. A commercial motor delivery vehicle body comprising side walls interconnected by floor and roof structures, said floor and roof structures having front end portions projecting beyond the front side edges of said side walls, the front end portion of said floor structure having a transverse, rectilinear front edge and rectilinear side edges extending to said side walls, said front end portion of the body having a driver's compartment on one side of said front end portion and an access compartment on the other side of said front end portion and communicating at the side thereof with said driver's compartment, closure means for said front end portion including a stationary panel extending downwardly from said roof structure to said floor structure and a movable panel extending downwardly from said roof structure to said floor structure, means for guiding the movement of said movable panel from one side of said front end portion to the other side thereof in a curvilinear path disposed inwardly of the front and side edges of said front end portion, said stationary panel enclosing said driver's compartment and said movable panel in one position thereof enclosing said access compartment and movable to another position exposing said access compartment for access to said driver's compartment and that portion of said body located rearwardly of said compartments, from the front or side edge of said front end portion.

2. A commercial delivery vehicle comprising a body including a floor structure, a roof structure and side walls connecting said structures, said structures having front end portions projecting beyond the front side edges of said side walls, said roof structure having a curved transverse edge at the front end thereof, said floor structure having a transverse rectilinear edge at the front edge thereof and rectilinear side edges extending rearwardly to said side walls, a fixed panel curved from side to side thereof extending downwardly from the curved front edge of said roof structure to the floor structure with one side edge thereof abutting the side edge of one side wall, a movable panel curved from side to side thereof, means for suspending said movable panel from the curved front edge of said roof structure for movement in a semicircular path located inwardly of the front and side edges of said floor structure from a position wherein one side edge of said movable panel abuts the side edge of the other side wall to positions wherein said one side edge of said movable panel approaches the other side edge of said fixed panel, whereby said movable panel provides a movable closure for one lateral portion of the front end of said body.

3. A commercial motor delivery vehicle having a body including a freight carrying portion and a front end portion located forwardly of said freight carrying portion and extending to opposite sides of said body, said front end portion comprising a driver's compartment on one side thereof and an access compartment on the other side thereof communicating laterally with said driver's compartment and rearwardly with the freight carrying portion of the body, closure means for the periphery of said driver's compartment comprising a stationary panel extending from a midpoint of said front end portion to the rear of said driver's compartment on the outer side thereof, closure means for the periphery of said access compartment comprising a movable panel movable in an arcuate path of substantially 90° extending from the midpoint of said front end portion to the rear of said access compartment on the outer side thereof to positions varying the opening to said access compartment.

4. A commercial delivery vehicle body comprising a freight carrying portion and a front end portion forwardly thereof, said front end portion including a floor structure having a transverse, rectilinear front edge and rectilinear side edges extending rearwardly of said front edge, said front end portion having a driver's compartment on the left hand half thereof and an access compartment on the right hand half thereof, said access compartment communicating with said freight carrying portion and said driver's compartment, closure means for said driver's compartment comprising an upstanding stationary panel having a substantially 90° curvature from side to side thereof, closure means for said access compartment comprising an upstanding laterally movable panel having a substantially 90° curvature from side to side thereof, adjacent side edges of said panels overlapping at a midsection of the front edge of said front end portion in the closed position of said movable panel, said movable panel being movable in an arcuate path of substantially 180° extent to an open position thereof exposing said access compartment for egress or ingress from the right hand half of the front edge or the right side edge of said front end portion, said movable panel in the open position thereof being in complementary, adjacent relation to said stationary panel.

5. A commercial delivery vehicle body including side walls, a roof structure and a floor structure interconnecting said side walls, said structures having forward end portions projecting beyond the forward edges of said side walls, said forward end portion of the roof structure having a curved, transverse edge of about 180° in angular extent, said forward end of the floor structure having a transverse rectilinear front edge and rectilinear side edges, closure means for the front end of said body comprising an upstanding stationary panel curved laterally between the side edges thereof and extending downwardly from the left hand half of the curved edge of said roof structure to said floor structure, and a laterally movable panel curved laterally between the side edges thereof, and interengageable means on the curved edge of said roof structure and the top edge of said movable panel for suspending said movable panel relative to said roof structure and guiding the movement of said movable panel between a position wherein said movable panel encloses the right hand half of the forward end of said body to positions exposing the opening at the right hand half of the forward end of said body.

6. A vehicle body as in claim 5 wherein said interengageable means is located outwardly of the top edge of said stationary panel and said movable panel is movable to a position locating the same exteriorly of and in complementary relation to said stationary panel.

7. A delivery vehicle body comprising a rear freight carrying portion and a front end portion forward of said freight carrying portion, said front end portion comprising laterally adjacent and directly communicating driver's and access compartments, said compartments being respectively located on opposite sides of said front end portion, said access compartment communicating at its rear directly with said freight carrying portion, said access compartment extending rearwardly to a point substantially coextensive with the rear of said driver's compartment, fixed closure means at the periphery of said driver's compartment extending from a midpoint of said front end portion to the rear thereof for enclosing the front and side of said driver's compartment, said access compartment having an outer peripheral opening extending laterally from said midpoint of the front end portion to the rear of said access compartment, and closure means for said opening laterally movable to progressively expose said opening from a point at the rear of said access compartment to said midpoint of the front end portion whereby direct access may be had to said freight carrying portion through said access compartment when said access compartment is inaccessible from the side thereof and direct access may be had to said freight carrying portion through said access compartment when said access compartment is inaccessible from the front thereof.

8. A vehicle body as in claim 7 wherein said peripheral opening of the access compartment is arcuate in extent and subtends an angle of substantially 90°.

References Cited in the file of this patent

UNITED STATES PATENTS

| | | |
|---|---|---|
| 92,964 | Ham | July 27, 1869 |
| 1,200,008 | Myers et al. | Oct. 3, 1916 |
| 1,611,248 | Smith et al. | Dec. 21, 1926 |
| 1,786,990 | Gowan | Dec. 30, 1930 |
| 1,919,387 | Stringer | July 25, 1933 |
| 2,051,753 | Steckly | Aug. 18, 1936 |
| 2,267,509 | Strong | Dec. 23, 1941 |
| 2,373,214 | Wolkenhauer | Apr. 10, 1945 |
| 2,464,923 | Davis | Mar. 22, 1949 |

FOREIGN PATENTS

| | | |
|---|---|---|
| 904,692 | France | Mar. 12, 1945 |
| 931,928 | Germany | Aug. 18, 1955 |